US011790260B2

(12) United States Patent
Griffin et al.

(10) Patent No.: US 11,790,260 B2
(45) Date of Patent: Oct. 17, 2023

(54) QUANTUM PROCESS TERMINATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 345 days.

(21) Appl. No.: 17/160,898

(22) Filed: Jan. 28, 2021

(65) Prior Publication Data
US 2022/0237491 A1    Jul. 28, 2022

(51) Int. Cl.
*G06F 9/44* (2018.01)
*G06N 10/00* (2022.01)
*G06F 8/30* (2018.01)
*G06F 9/52* (2006.01)

(52) U.S. Cl.
CPC .............. *G06N 10/00* (2019.01); *G06F 8/316* (2013.01); *G06F 9/526* (2013.01)

(58) Field of Classification Search
CPC ...................................................... G06N 10/00
USPC ........................................................ 719/320
See application file for complete search history.

(56) References Cited

U.S. PATENT DOCUMENTS

| 10,313,114 | B2 | 6/2019 | Fu | |
|---|---|---|---|---|
| 10,467,543 | B2 | 11/2019 | Macready et al. | |
| 10,621,140 | B2 | 4/2020 | Raymond | |
| 10,621,502 | B2 | 4/2020 | Solgun et al. | |
| 2012/0072913 | A1* | 3/2012 | Uola | G06F 9/5033 718/100 |
| 2017/0017894 | A1* | 1/2017 | Lanting | G06F 15/82 |
| 2020/0097859 | A1 | 3/2020 | Hu et al. | |
| 2021/0004707 | A1* | 1/2021 | Gambetta | G06F 15/16 |

FOREIGN PATENT DOCUMENTS

CN        109214517 A        1/2019

OTHER PUBLICATIONS

Li, Yangjia, et al., "Algorithmic Analysis of Termination Problems for Quantum Programs," Proceedings of the ACM on Programming Languages, vol. 2, No. POPL, Article 35, Jan. 2018, 29 pages.

\* cited by examiner

*Primary Examiner* — Timothy A Mudrick
(74) *Attorney, Agent, or Firm* — Dority & Manning, P.A.

(57) ABSTRACT

Quantum process termination is disclosed. A quantum computing system receives a request to terminate a quantum process. The quantum computing system determines that the quantum process utilizes a first qubit. The quantum computing system terminates the quantum process and modifies qubit metadata to indicate that the qubit is available for use.

20 Claims, 5 Drawing Sheets

QUANTUM PROCESS TERMINATION

BACKGROUND

Quantum computing utilizes qubits to perform quantum calculations. Qubits are finite resources. As quantum computing continues to increase in popularity and become more commonplace, it will be desirable to ensure that a termination of a quantum process does not unduly limit further access to a qubit.

SUMMARY

The disclosed examples implement a quantum process termination mechanism that ensures that the status of a qubit as being available or unavailable is consistent with whether a qubit is being used by a quantum process or is not being used by a quantum process.

In one example a method is provided. The method includes receiving, by a quantum computing system, a first request to terminate a first quantum process. The method further includes determining that the first quantum process utilizes a first qubit. The method further includes terminating the first quantum process. The method further includes modifying qubit metadata to indicate that the first qubit is available for use.

In another example a quantum computing system is provided. The quantum computing system includes a memory, and a processor device coupled to the memory. The processor device is to receive a first request to terminate a first quantum process. The processor device is further to determine that the first quantum process utilizes a first qubit. The processor device is further to terminate the first quantum process. The processor device is further to modify qubit metadata to indicate that the first qubit is available for use.

In another example a non-transitory computer-readable storage medium is provided. The non-transitory computer-readable storage medium includes executable instructions to cause a processor device to receive a first request to terminate a first quantum process. The executable instructions further cause the processor device to determine that the first quantum process utilizes a first qubit. The executable instructions further cause the processor device to terminate the first quantum process. The executable instructions further cause the processor device to modify qubit metadata to indicate that the first qubit is available for use.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
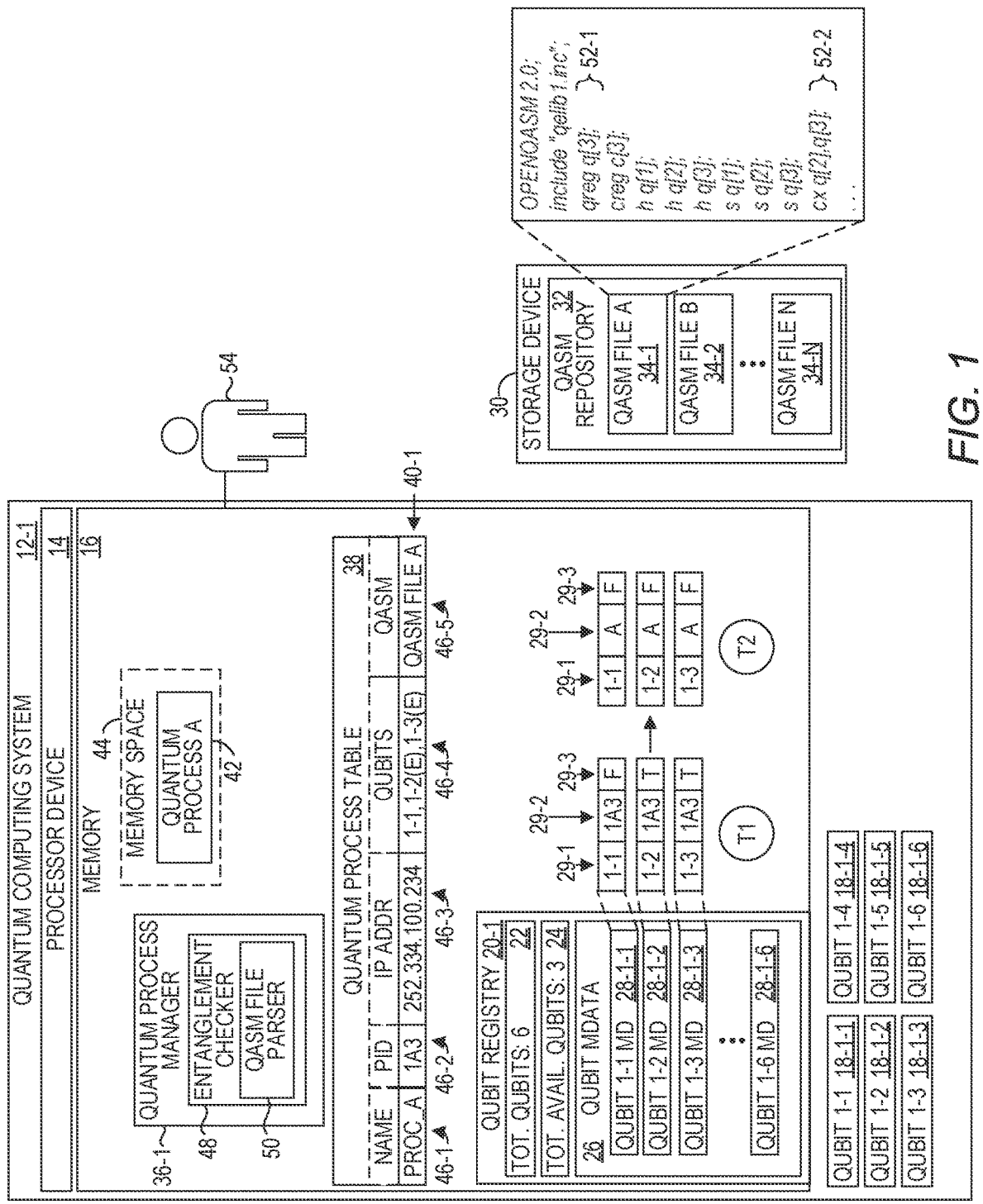
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, it will be desirable to ensure that a termination of a quantum process does not unduly limit further access to a qubit.

The disclosed examples implement a quantum process termination mechanism that ensures that the status of a qubit as being available or unavailable is consistent with whether a qubit is being used by a quantum process or is not being used by a quantum process. In particular, the quantum process termination mechanism ensures that qubits utilized by a quantum process that has been prematurely terminated are properly designated to be available for subsequent use. This ensures that such qubits can be immediately used by a different quantum process, thereby maximizing use of a finite and critical resource of quantum computing systems. In some implementations, the disclosed examples may also ensure that a quantum process that is utilizing an entangled qubit is not prematurely terminated unless the actor seeking the termination is aware of the entanglement, or that the actor seeking the termination expressly indicates that the quantum process should be terminated irrespective of the entangled state of any qubits utilized by the quantum process. In some implementations, the disclosed examples implement distributed use of qubits among a plurality of quantum computing systems, and a distributed quantum process termination mechanism for ensuring that each of the plurality of quantum computing systems has a real-time and accurate view of which qubits are available and which qubits are not available.

FIG. 1 is a block diagram of an environment 10 in which examples may be practiced. The environment 10 includes a quantum computing system 12-1 which operates in a quantum environment but can operate using classical computing principles or quantum computing principles. When using quantum computing principles, the quantum computing system 12-1 performs computations that utilize quantum-mechanical phenomena, such as superposition and entanglement. The quantum computing system 12-1 may operate under certain environmental conditions, such as at or near 0° Kelvin. When using classical computing principles, the quantum computing system 12-1 utilizes binary digits that have a value of either 1 or 0.

The quantum computing system 12-1 includes at least one processor device 14 and at least one memory 16. The quantum computing system 12-1 implements six qubits 18-1-1-18-1-6 (generally, qubits 18). The quantum computing system 12-1 includes a qubit registry 20-1 which maintains information about the qubits 18-1-1-18-1-6, including, by way of non-limiting example, a total qubits counter 22 that maintains count of the total number of qubits 18 implemented by the quantum computing system 12-1, and a total available qubits counter 24 that maintains count of the total number of qubits 18 that are currently available for allocation.

The qubit registry 20-1 also maintains qubit metadata 26, which comprises a plurality of qubit registry records 28-1-1-28-1-6, each of which maintains information about a corresponding qubit 18-1-1-18-1-6, such as, by way of non-limiting example, a field 29-1 that contains an identifier of the corresponding qubit 18-1-1-18-1-6, a field 29-2 that identifies whether the qubit is available for use ("A") or is in use by a particular quantum process, and if the latter, the quantum process ID of the quantum process that is currently using the corresponding qubit 18-1-1-18-1-6, and a field 29-3 that is a true/false flag that indicates whether the corresponding qubit 18-1-1-18-1-6 is currently in an entangled state.

The quantum computing system 12-1 includes or is communicatively coupled to one or more storage devices 30. The storage device 30 implements a quantum assembly language (QASM) repository 32 in which a plurality of QASM files 34-1-34-N are stored. The quantum computing system 12-1 is capable of initiating a plurality of different quantum processes. The term "quantum process" as used herein refers to a process that executes on the quantum computing system 12-1 and that accesses one or more of the qubits 18-1-1-18-1-6 and provides some desired functionality. Each quantum process is implemented via a corresponding QASM file 34-1-34-N, each of which comprises quantum computing instructions.

In some implementations, the quantum computing system 12-1 includes a quantum process manager 36-1 which maintains a quantum process table 38 that includes quantum process information about quantum processes executing on the quantum computing system 12-1. In this example, the quantum process table 38 includes a row 40-1 that corresponds to a quantum process 42 that is currently executing on the quantum computing system 12-1 in a memory space 44 of the memory 16.

Each row 40 contains five data fields 46-1-46-5. The data field 46-1 identifies the name of the particular quantum process that is associated with that row 40. The data field 46-2 identifies a unique process identifier (PID) that is associated with that row 40. The process name identified in the data field 46-1 remains the same over successive executions of a quantum process, while the PID will change for each execution of a quantum process. The data field 46-3 identifies whether the quantum process has an associated internet protocol (IP) address. The data field 46-4 identifies the qubits 18 that are utilized by the quantum process and whether the qubits 18 are entangled. The data field 46-5 identifies the name and location of the QASM file 34 that implements the quantum process associated with that row 40.

The row 40-1 corresponds to the quantum process 42. The data field 46-1 of the row 40-1 indicates that the name of the quantum process 42 is PROC_A. The data field 46-2 of the row 40-1 indicates that the quantum process 42 was assigned the process ID of 1A3. The data field 46-3 indicates that the quantum process 42 can be reached via an IP address of 252.334.100.234. The data field 46-4 indicates that the quantum process 42 utilizes the three qubits 18-1-1, 18-1-2, and 18-1-3, and that the qubits 18-1-2 and 18-1-3 are in an entangled state. The data field 46-5 indicates that the quantum process 42 is implemented by the QASM file 34-1.

The quantum process manager 36-1 includes an entanglement checker 48 that operates to determine whether one or more of the qubits 18-1-1-18-1-6 are entangled. The entanglement checker 48 may determine an entanglement status of one or more of the qubits 18-1-1-18-1-6 periodically, intermittently, upon request, or in response to some event on the quantum computing system 12-1.

The entanglement checker 48 accesses the QASM files 34-1-34-N to determine if the quantum processes that utilize the qubits 18-1-1-18-1-6 entangle the qubits 18-1-1-18-1-6. The entanglement checker 48 may include a QASM file parser 50 that is configured to parse the respective QASM files 34 in accordance with a QASM programming language syntax. The entanglement checker 48 identifies quantum programming instructions that, when executed, cause a qubit 18-1-1-18-1-6 to become entangled. The entanglement checker 48 accesses correspondence information (not illustrated) that identifies the correspondence between the QASM files 34 and quantum processes executing on the quantum computing system 12-1.

As an example, the entanglement checker 48 may access the row 40-1 of the quantum process table 38 that corresponds to the quantum process 42. The entanglement checker 48 may access the data field 46-5 of the row 40-1 of the quantum process table 38 to determine that the quantum process 42 is implemented via the QASM file 34-1.

The entanglement checker 48 accesses the QASM file 34-1. The QASM file 34-1 includes a plurality of quantum programming instructions in a quantum programming language. The entanglement checker 48 reads the quantum programming instructions, parses the quantum programming instructions in accordance with a syntax of the respective programming language, and analyzes the quantum programming instructions. Based on a "qreg q[3]" instruction 52-1, the entanglement checker 48 makes a determination that the quantum process 42 uses three qubits 18. The correspondence between the qubits 18-1-1, 18-1-2, and 18-1-3 and the qubits 18 manipulated in the QASM file 34-1 may be via an explicit identifier, or may be maintained elsewhere, such as the qubit metadata 26, and/or the quantum process table 38. Based on a "cx q[2],q[3]" instruction 52-2, which utilizes the cnot gate, the entanglement checker 48 makes a determination that, if the quantum process 42 is executing, the qubits 18-1-2 and 18-1-3 are entangled. The entanglement checker 48 accesses the data field 46-2 of the row 40-1 of the quantum process table 38 and determines that the quantum process 42 is executing. The entanglement checker 48 thus determines that the qubits 18-1-2 and 18-1-3 are entangled and updates the data field 46-4 of the quantum process table 38 to indicate that the qubits 18-1-2 and 18-1-3 are entangled. The entanglement checker 48 may also update the qubit registry records 28 that correspond to the qubits 18-1-2 and 18-1-3 to indicate that the qubits 18-1-2 and 18-1-3 are entangled.

It is noted that because the quantum process manager 36-1 is a component of the quantum computing system 12-1, functionality implemented by the quantum process manager 36-1 may be attributed to the quantum computing system 12-1 generally. Moreover, in examples where the quantum process manager 36-1 comprises software instructions that program the processor device 14 to carry out functionality discussed herein, functionality implemented by the quantum process manager 36-1 may be attributed herein to the processor device 14. It is further noted that while, for purposes of illustration only, the quantum process manager 36-1 is depicted as a single component that includes the entanglement checker 48, which in turn includes the QASM file parser 50, it is apparent that the functionality implemented by such components could be implemented in any number of components, such as more than three components or a single component, and the examples discussed herein are not limited to any particular number of components.

At a previous point in time to that illustrated in FIG. 1, an operator 54 issued a request to the quantum process manager 36-1 to initiate the quantum process 42 from the QASM file 34-1. The quantum process manager 36-1 caused an allocation of the memory space 44 and initiated the quantum process 42 in the memory space 44 via the QASM file 34-1. The quantum process manager 36-1 generated the row 40-1; entered the name, PROC_A, of the quantum process 42 in the data field 46-1; assigned the quantum PID 1A3 to the quantum process 42 and entered the quantum PID 1A3 in the data field 46-2; assigned the IP address 252.334.100.234 to the quantum process 42 and entered the IP address 252.334.100.234 in the data field 46-3; and entered the name of the QASM file 34-1 that implements the functionality of the quantum process 42 into the data field 46-5. In some implementations, during the initiation of the quantum process 42, the quantum process manager 36-1 may also analyze and parse the QASM file 34-1 to determine which qubits 18 are utilized by the quantum process 42, and whether such qubits 18 will be entangled by the quantum process 42 during execution. The quantum process manager 36-1 may then enter the appropriate information in the data field 46-2 and cause the qubit metadata 26 to be updated to reflect the status of such qubits 18, as indicated by the label T1. In this example, the quantum process manager 36-1 determines that the quantum process 42 utilizes the qubits 18-1-1, 18-1-2, and 18-1-3, and entangles the qubits 18-1-2 and 18-1-3.

Assume that at a subsequent point in time, the operator 54 enters a request to terminate the quantum process 42. The request may include a predetermined keyword, such as, by way of non-limiting example, "halt" and information that identifies the quantum process 42. The information that identifies the quantum process 42 may be, for example, the alphanumeric characters that uniquely identify the quantum process 42, in this example, "PROC_A", or may be the quantum process ID, in this example, 1A3.

The quantum process manager 36-1 receives the request to terminate the quantum process 42. If the quantum process manager 36-1 had not previously analyzed and parsed the QASM file 34-1 to determine which qubits 18 are utilized by the quantum process 42, and whether such qubits 18 will be entangled by the quantum process 42 during execution, the quantum process manager 36-1 does so in response to the termination request. In this example, assume that the quantum process 42 analyzed and parsed the QASM file 34-1 to determine which qubits 18 are utilized by the quantum process 42, and whether such qubits 18 will be entangled at the time of initiation of the quantum process 42. The quantum process manager 36-1 accesses the data field 46-4 and determines that the quantum process 42 utilizes the qubits 18-1-1, 18-1-2, and 18-1-3, and entangles the qubits 18-1-2 and 18-3.

In response to determining that the qubits 18-1-2 and 18-1-3 are in an entangled state, the quantum process manager 36-1 may take any of several actions depending, for example, on the precise command used by the operator 54 to request the termination of the quantum process 42 or a system configuration option. In one implementation, the operator 54 may enter a particular termination command associated with a hard terminate action, such that the quantum process 42 is to be terminated irrespective of whether the quantum process 42 causes entanglement of qubits 18 or not. In some implementations, the hard terminate action may be a flag or option that may be used in conjunction with a terminate command.

If the operator 54 did not enter a terminate command that indicates the hard terminate action, the quantum process manager 36-1 may, in one implementation, prior to continuing with the termination of the quantum process 42, send a message to the operator 54 that indicates the qubits 18-1-2 and 18-1-3 are in an entangled state. The quantum process manager 36-1 may await an additional request to terminate the quantum process 42 prior to continuing with the termination of the quantum process 42. If no such additional request is entered within a predetermined time frame, the quantum process manager 36-1 may simply disregard the initial request and not terminate the quantum process 42. In other implementations, if the operator 54 did not enter a terminate command that indicates the hard terminate action, the quantum process manager 36-1 may simply disregard the initial request and inhibit termination of the quantum process 42.

In this example, assume that the operator 54 entered a terminate command that indicates the hard terminate action. The quantum process manager 36-1 initiates a quantum input/output operation on the qubit 18-1-2, such as a quantum read operation on the qubit 18-1-2, to destroy the entanglement of the qubits 18-1-2 and 18-1-3. The quantum process manager 36-1 issues an operating system command to cause the termination of the quantum process 42 and the deallocation of the memory space 44 to return the memory space 44 back to an available pool of memory. The quantum process manager 36-1 then modifies the qubit registry records 28-1-1-28-1-3 to indicate that the qubits 18-1-1, 18-1-2, and 18-1-3 are available for use by other quantum processes, as indicated by the label T2.

Figure 2:
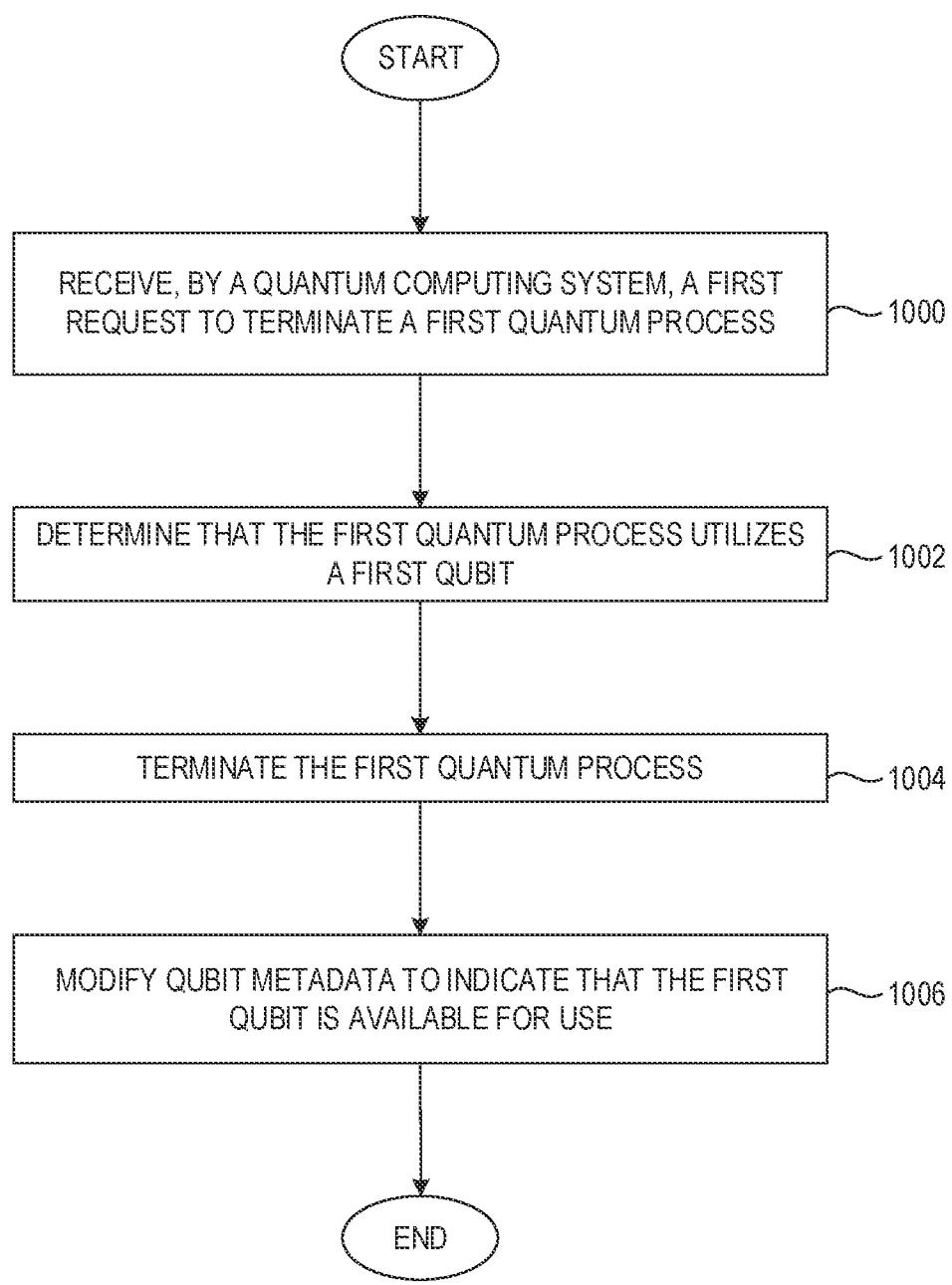
FIG. 2 is a flowchart of a method for quantum process termination according to one implementation.

FIG. 2 is a flowchart of a method for quantum process termination according to one implementation. FIG. 2 will be discussed in conjunction with FIG. 1. The quantum process manager 36-1 receives the request to terminate the quantum process 42 (FIG. 2, block 1000). The quantum process manager 36-1 determines that the quantum process 42 utilizes the qubits 18-1-1-18-1-3 (FIG. 2, block 1002). In this example, the quantum process manager 36-1 destroys the entangled state of the qubits 18-1-2 and 18-1-3, and terminates the quantum process 42 (FIG. 2, block 1004). The quantum process manager 36-1 modifies the qubit metadata 26 to indicate that the qubits 18-1-1-18-1-3 are available for use (FIG. 2, block 1006).

Figure 3:
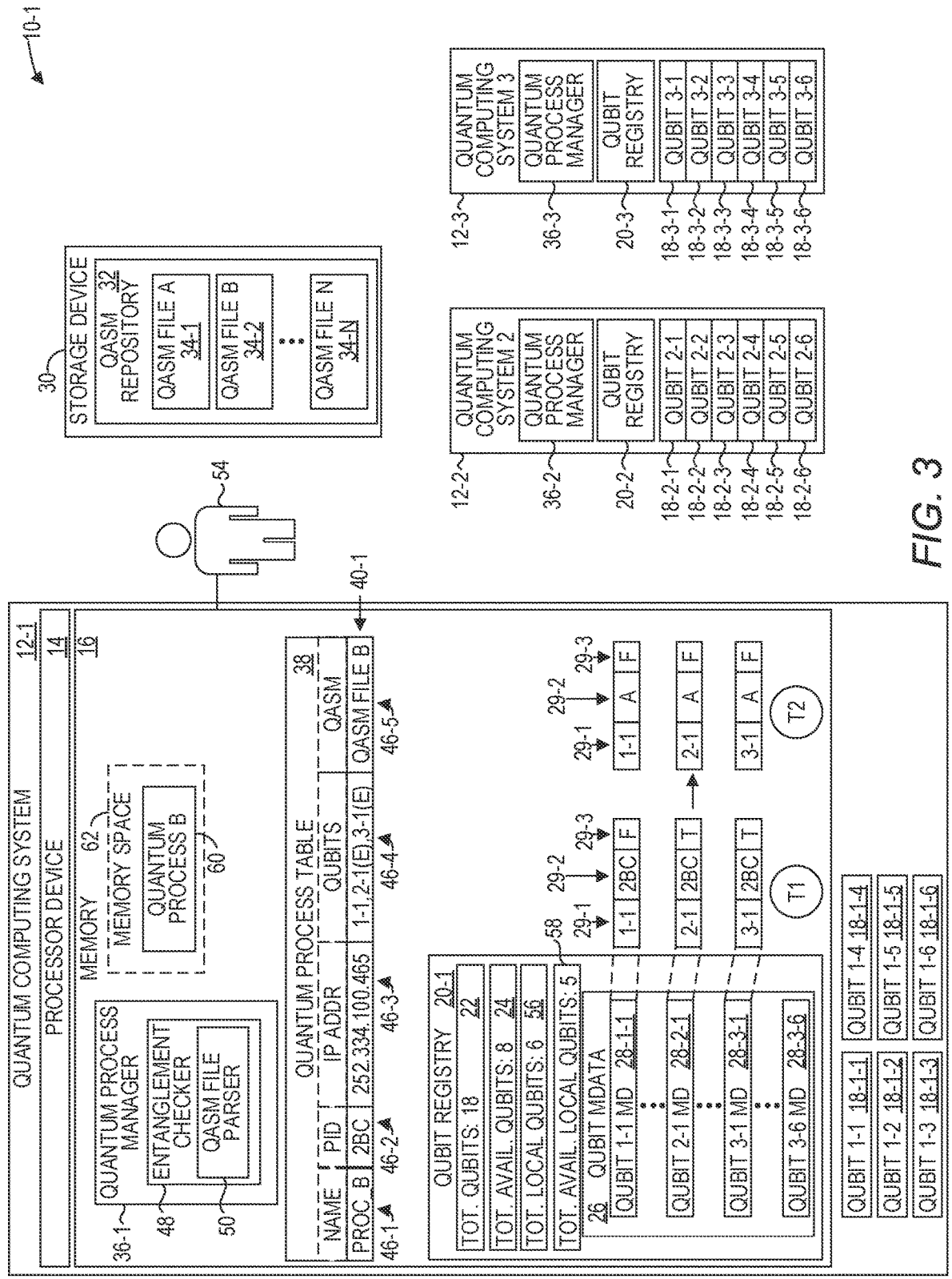
FIG. 3 is a block diagram of an environment in which additional examples may be practiced.

FIG. 3 is a block diagram of an environment 10-1 according to another implementation. The environment 10-1 is identical to the environment 10 except as otherwise discussed below. In this example, the environment 10-1 includes a quantum computing system 12-2 and a quantum computing system 12-3. Although due to spatial limitations FIG. 3 illustrates the quantum computing system 12-2 and the quantum computing system 12-3 as having fewer components than the quantum computing system 12-1, in practice, the quantum computing system 12-2 and the quantum computing system 12-3 are configured substantially similarly to the quantum computing system 12-1, as discussed above. The quantum computing system 12-2 includes a quantum process manager 36-2 and a qubit registry 20-2, and implements a plurality of qubits 18-2-1-18-2-6. The quantum computing system 12-3 includes a quantum process manager 36-3, a qubit registry 20-3, and implements a plurality of qubits 18-3-1-18-3-6.

The quantum computing systems 12-1-12-3 (generally, quantum computing systems 12), via the qubit registries 20-1-20-3, implement a distributed qubit registry, wherein each quantum computing system 12 maintains track of a status of each of the qubits 18-1-1-18-3-6, and quantum processes managed and controlled by the quantum process managers 36-1-36-3 may utilize any available qubit 18-1-1-18-3-6 during processing. Upon a change in a status of a qubit 18 on a particular quantum computing system 12, such quantum computing system 12 broadcasts a qubit metadata update record to the other quantum computing systems 12.

In this example, at a time T1, the qubit registry 20-1 maintains a total qubit counter 22 that indicates the three quantum computing systems 12-1-12-3 have a total of eighteen qubits 18, a total available qubit counter 24 that indicates eight of such qubits 18 are available, a total local qubits counter 56 that indicates the quantum computing system 12-1 implements a total of six qubits, and a total available local qubits counter 58 that indicates that five of the six local qubits 18 are currently available. While not illustrated in detail, the qubit registries 20-2 and 20-3 have the same qubit counters as discussed with regard to the quantum computing system 12-1.

The quantum computing system 12-1 is currently executing a quantum process 60 in a memory space 62. The row 40-1 of the quantum process table 38 corresponds to the quantum process 60 and indicates that the quantum process 60 has a name of "PROC_B", a PID of 2BC, uses the IP address 252.334.100.465, and uses the qubit 18-1-1 on the quantum computing system 12-1, the qubit 18-2-1 on the quantum computing system 12-2, and the qubit 18-3-1 on the quantum computing system 12-3. The qubits 18-2-1 and 18-3-1 are indicated as being entangled. The row 40-1 indicates that the quantum process 60 is implemented via the QASM file 34-2.

Assume that the operator 54 enters a request to terminate the quantum process 60 with a hard terminate indicator. The quantum process manager 36-1 receives the request to terminate the quantum process 60. The quantum process manager 36-1 accesses the data field 46-4 and determines that the quantum process 60 utilizes the qubits 18-1-1, 18-2-1, and 18-3-1, and that the qubits 18-2-1 and 18-3-1 are entangled.

In response to determining that the qubits 18-2-1 and 18-3-1 are in an entangled state, the quantum process manager 36-1 sends a message to the quantum process manager 36-2 requesting that the quantum process manager 36-2 alter the entangled status of the qubit 18-2-1. The quantum process manager 36-2 receives the message and issues a quantum input/output operation on the qubit 18-2-1, such as by initiating a read operation on the qubit 18-2-1. The quantum process manager 36-2 sends a message to the quantum process manager 36-1 indicating that the qubit 18-2-1 is no longer entangled. Because the qubit 18-2-1 was entangled with the qubit 18-3-1, the qubit 18-3-1 is also no longer entangled.

The quantum process manager 36-1 issues an operating system command to cause the termination of the quantum process 60 and the deallocation of the memory space 62 to return the memory space 62 back to an available pool of memory. The quantum process manager 36-1 then modifies the qubit registry records 28-1-1, 28-2-1, 28-3-1 to indicate that the qubits 18-1-1, 18-2-1, 18-3-1 are available for use by other quantum processes, as indicated by the label T2. The quantum process manager 36-1 sends one or more qubit metadata update records to the quantum computing systems 12-2 and 12-3 that indicate that the qubits 18-1-1, 18-2-1, and 18-3-1 are available for use by other quantum processes. The quantum computing systems 12-2 and 12-3 receive the one or more qubit metadata update records and update the qubit registries 20-2 and 20-3 accordingly.

Figure 4:
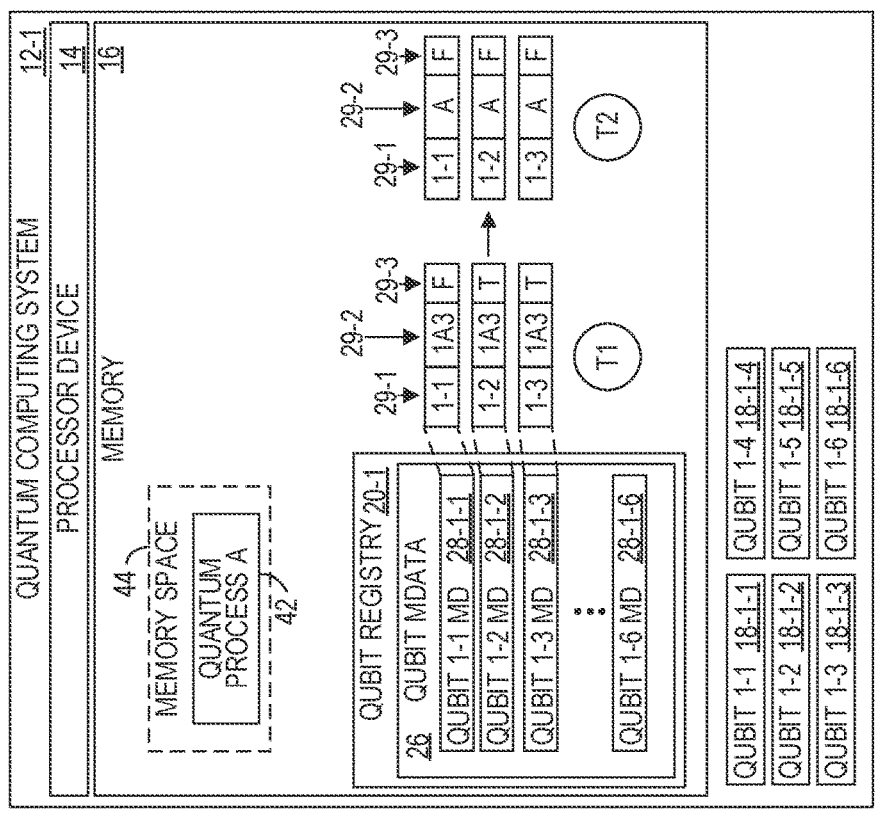
FIG. 4 is a simplified block diagram of the environment illustrated in FIG. 1 according to another implementation.

FIG. 4 is a simplified block diagram of the environment 10 illustrated in FIG. 1 according to another implementation. The environment 10 includes the quantum computing system 12-1, which in turn includes the memory 16 and the processor device 14 coupled to the memory 16. The processor device 14 is to receive a request to terminate the quantum process 42. The processor device 14 is further to determine that the qubits 18-1-1, 18-1-2, and 18-1-3 are utilized by the quantum process 42. The processor device 14 is further to terminate the quantum process 42 and modify the qubit metadata 26 to indicate that the qubits 18-1-1, 18-1-2, and 18-1-3 are available for use.

Figure 5:
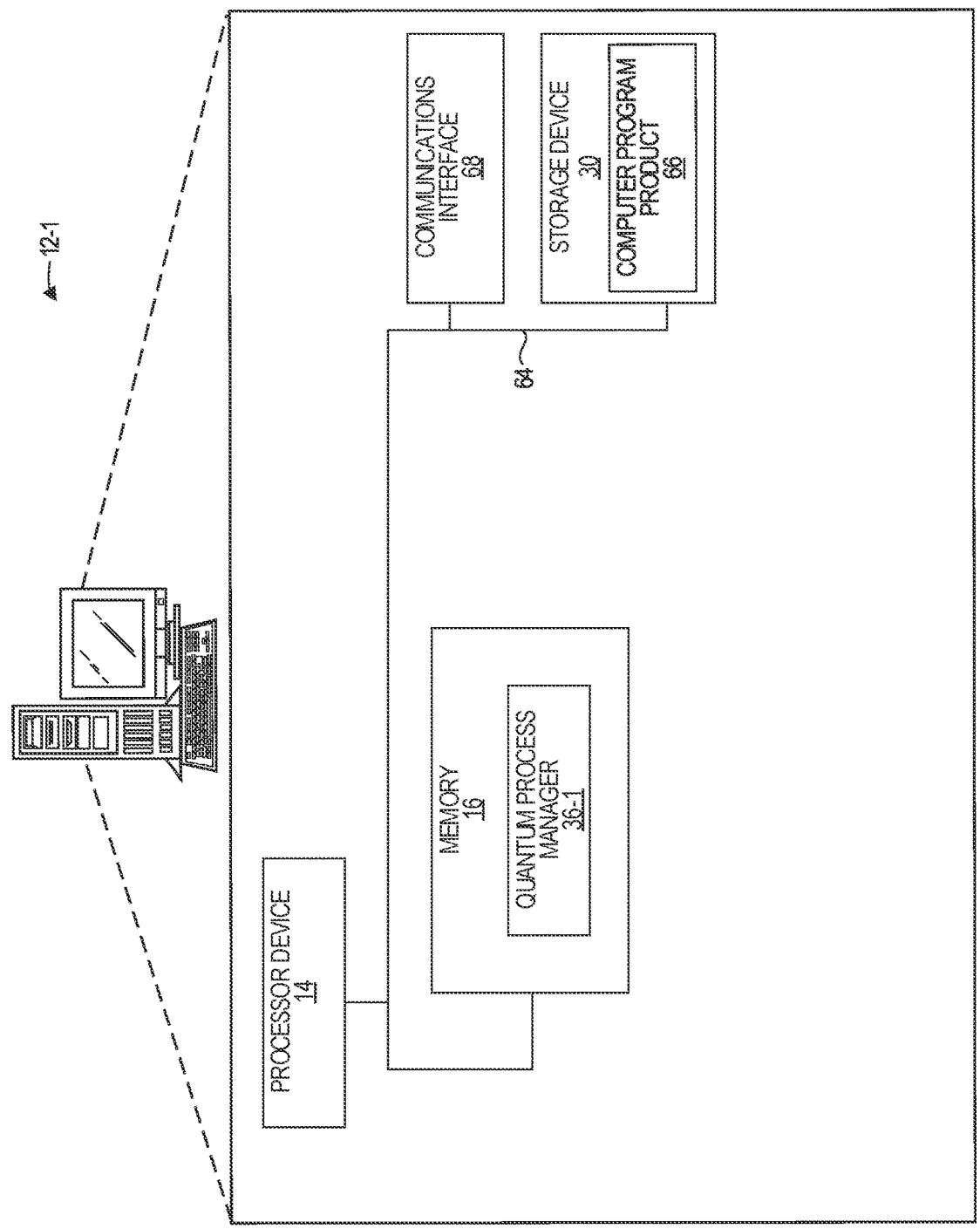
FIG. 5 is a block diagram of the quantum computing system illustrated in FIG. 1 according to one example.

FIG. 5 is a block diagram of the quantum computing system 12-1 suitable for implementing examples according to one example. The quantum computing system 12-1 may comprise any computing or electronic device capable of including firmware, hardware, and/or executing software instructions to implement the functionality described herein in a quantum environment. The quantum computing system 12-1 includes the one or more processor devices 14, the one or more memories 16 and a system bus 64. The system bus 64 provides an interface for system components including, but not limited to, the one or more memories 16 and the one or more processor devices 14. The processor devices 14 can be any commercially available or proprietary processor suitable for operating in a quantum environment. The quantum computing system 12-1 may further include or be coupled to a non-transitory computer-readable storage medium such as the storage device 30. The storage device 30 and other drives associated with computer-readable media and computer-usable media may provide non-volatile storage of data, data structures, computer-executable instructions, and the like.

A number of modules can be stored in the storage device 30 and in the memory 16, including the quantum process manager 36-1. All or a portion of the examples may be implemented as a computer program product 66 stored on a transitory or non-transitory computer-usable or computer-readable storage medium, such as the storage device 30, which includes complex programming instructions, such as complex computer-readable program code, to cause the one or more processor devices 14 to carry out the steps described herein. Thus, the computer-readable program code can comprise software instructions for implementing the functionality of the examples described herein when executed on the one or more processor devices 14.

An operator, such as the operator 54, may also be able to enter one or more configuration commands through a keyboard (not illustrated), a pointing device such as a mouse (not illustrated), or a touch-sensitive surface (not illustrated). The quantum computing system 12-1 may also include a communications interface 68 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a quantum computing system, a first request to terminate a first quantum process;
determining that the first quantum process utilizes a first qubit;
terminating the first quantum process; and
modifying qubit metadata to indicate that the first qubit is available for use.

2. The method of claim 1 wherein terminating the first quantum process comprises determining a memory space that is allocated to the first quantum process, and deallocating the memory space to thereby make the memory space available for use.

3. The method of claim 1 wherein receiving the first request to terminate the first quantum process comprises receiving a process identifier that uniquely identifies the first quantum process.

4. The method of claim 1 wherein receiving the first request to terminate the first quantum process comprises receiving a process name comprising alphanumeric characters that uniquely identifies the first quantum process, and further comprising:
determining, based on the process name, a process identifier that uniquely identifies the first quantum process.

5. The method of claim 1 wherein determining that the first quantum process utilizes the first qubit further comprises:
determining a location of a quantum assembly language (QASM) file that contains quantum programming instructions that implement the first quantum process; and
analyzing the QASM file to identify the first qubit.

6. The method of claim 1 further comprising:
prior to terminating the first quantum process, determining that the first qubit is in an entangled state; and
in response to determining that the first qubit is in the entangled state, sending a message that indicates the first qubit is in the entangled state.

7. The method of claim 6 further comprising:
subsequent to sending the message that indicates the first qubit is in the entangled state, and prior to terminating the first quantum process, receiving a second request to terminate the first quantum process; and
initiating a quantum input/output operation on the first qubit to cause the first qubit to leave the entangled state.

8. The method of claim 7 wherein initiating the quantum input/output operation on the first qubit to cause the first qubit to leave the entangled state comprises initiating a read operation on the first qubit.

9. The method of claim 6 wherein determining that the first qubit is in the entangled state further comprises:
determining a location of a quantum assembly language (QASM) file that contains quantum programming instructions that implement the first quantum process;
parsing the QASM file in accordance with a QASM programming language syntax; and
determining that the quantum programming instructions cause the first qubit to enter the entangled state.

10. The method of claim 1 wherein the first request requests a hard terminate action, and further comprising:
prior to terminating the first quantum process, determining that the first qubit is in an entangled state; and
automatically initiating a quantum input/output operation on the first qubit to cause the first qubit to leave the entangled state.

11. The method of claim 1 wherein the first quantum process utilizes the first qubit on the quantum computing system and a second qubit on a second quantum computing system; and
wherein modifying the qubit metadata to indicate that the first qubit is available for use further comprises modifying the qubit metadata to indicate that the second qubit is available for use.

12. The method of claim 11 further comprising:
subsequent to terminating the first quantum process, sending a qubit metadata update record to the second quantum computing system that indicates that the first qubit is available and the second qubit is available.

13. The method of claim 1 further comprising:
receiving a second request to terminate a second quantum process that utilizes a second qubit;
determining that the second qubit is utilized by the second quantum process;
prior to terminating the second quantum process, determining that the second qubit is in an entangled state;
in response to determining that the second qubit is in the entangled state, sending a message that indicates the second qubit is in the entangled state; and
disregarding the second request and inhibiting termination of the second quantum process.

14. The method of claim 1 wherein modifying the qubit metadata to indicate that the first qubit is available for use comprises modifying a qubit registry record of a qubit registry to indicate that the first qubit is available for use, the qubit registry record corresponding to the first qubit, the qubit registry comprising a plurality of qubit registry records, each qubit registry record corresponding to a different qubit of a plurality of qubits implemented by the quantum computing system.

15. A quantum computing system, comprising:
a memory; and
a processor device coupled to the memory to:
receive a first request to terminate a first quantum process;
determine that the first quantum process utilizes a first qubit;
terminate the first quantum process; and
modify qubit metadata to indicate that the first qubit is available for use.

16. The quantum computing system of claim 15 wherein to determine that the first quantum process utilizes the first qubit, the processor device is further to:
determine a location of a quantum assembly language (QASM) file that contains quantum programming instructions that implement the first quantum process; and
analyze the QASM file to identify the first qubit.

17. The quantum computing system of claim 15 wherein the processor device is further to:
prior to terminating the first quantum process, determine that the first qubit is in an entangled state; and in response to determining that the first qubit is in the entangled state, send a message that indicates the first qubit is in the entangled state.

18. The quantum computing system of claim 15 wherein the first request requests a hard terminate action, and wherein the processor device is further to:
prior to terminating the first quantum process, determine that the first qubit is in an entangled state; and
automatically initiate a quantum input/output operation on the first qubit to cause the first qubit to leave the entangled state.

19. A non-transitory computer-readable storage medium that includes executable instructions to cause a processor device to:
receive a first request to terminate a first quantum process;
determine that the first quantum process utilizes a first qubit;
terminate the first quantum process; and
modify qubit metadata to indicate that the first qubit is available for use.

20. The non-transitory computer-readable storage medium of claim 19 wherein to determine that the first quantum process utilizes the first qubit, the instructions further cause the processor device to:
determine a location of a quantum assembly language (QASM) file that contains quantum programming instructions that implement the first quantum process; and
analyze the QASM file to identify the first qubit.

\* \* \* \* \*